Aug. 7, 1934.     G. J. LANG     1,968,948
WIND DEFLECTOR
Filed Oct. 21, 1932     2 Sheets-Sheet 1
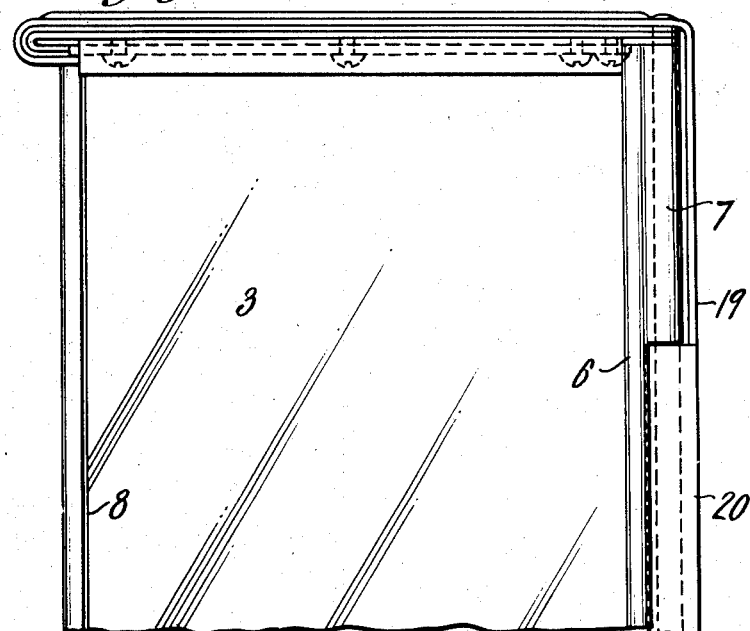
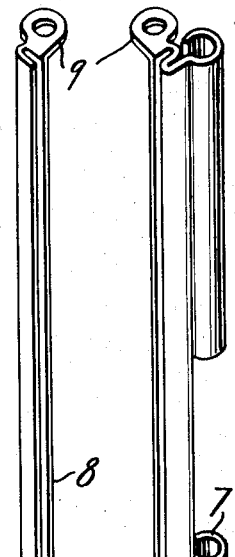
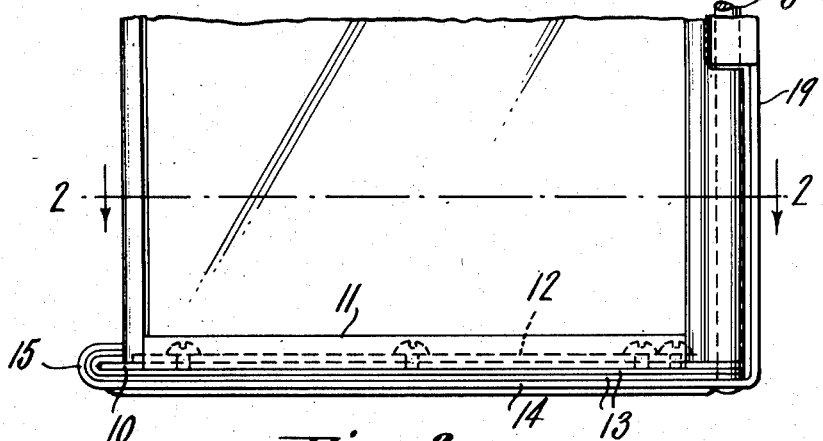
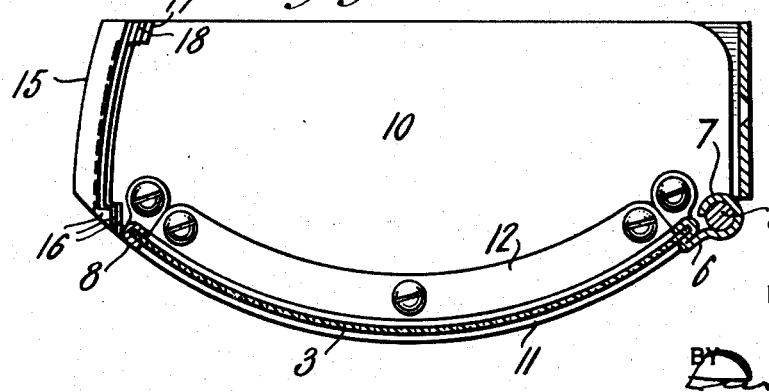
INVENTOR
GUSTAVE J. LANG
ATTORNEY

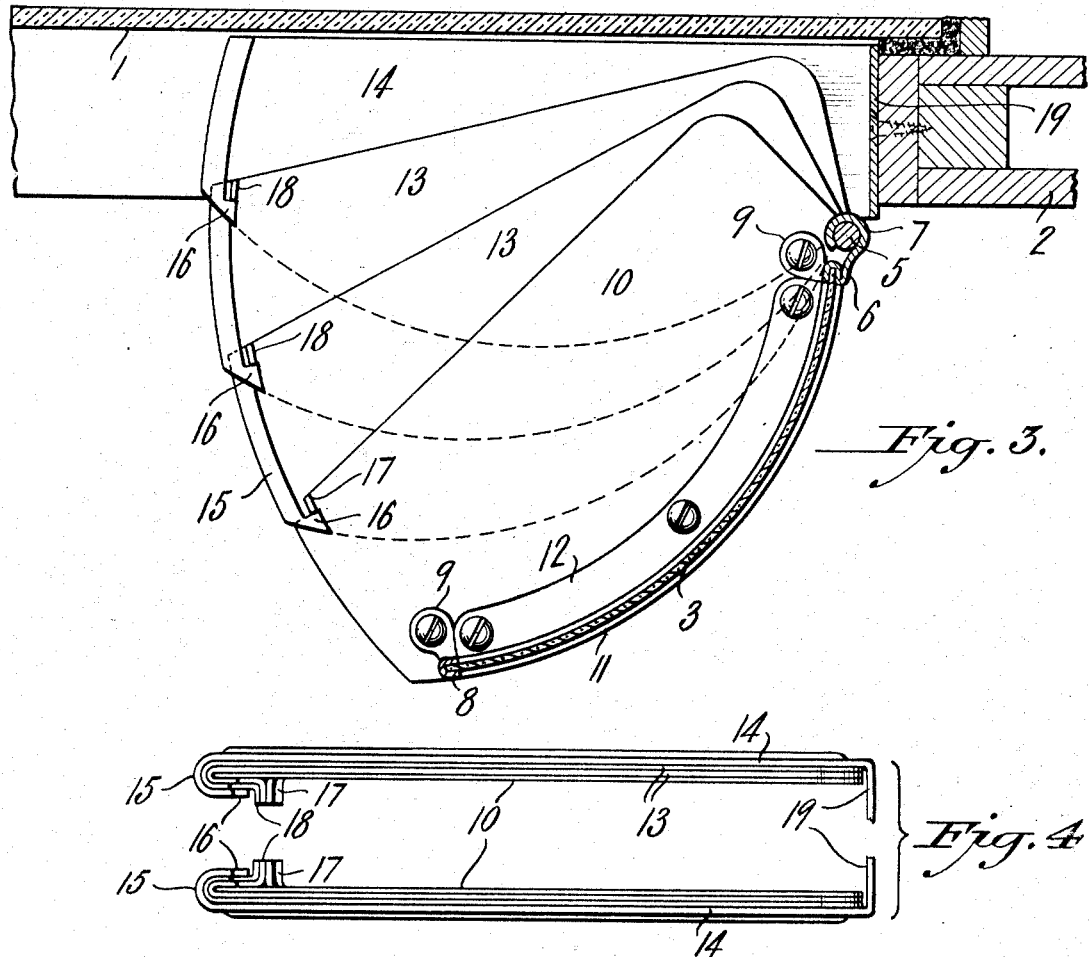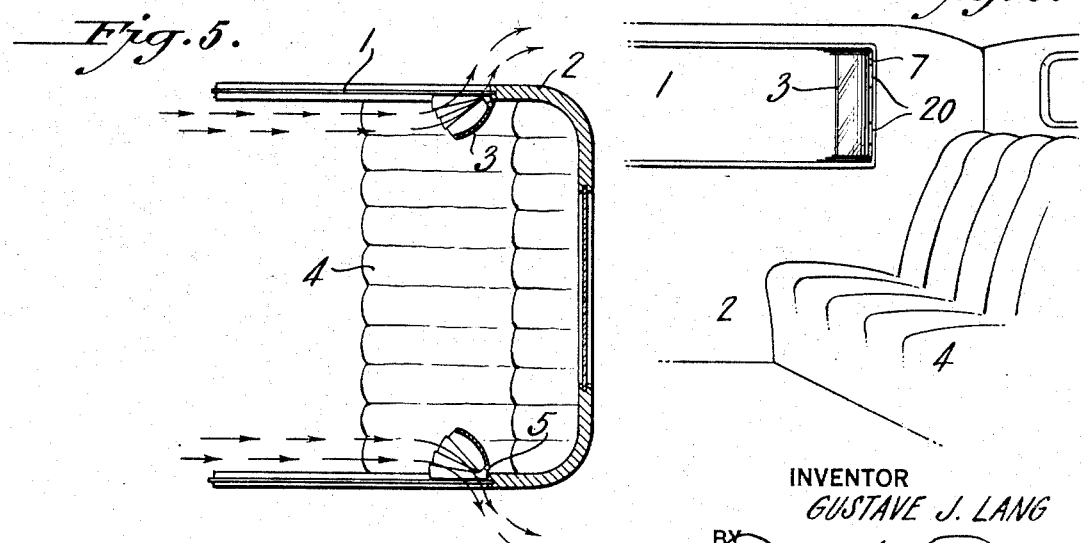

Patented Aug. 7, 1934

1,968,948

UNITED STATES PATENT OFFICE 1,968,948

WIND DEFLECTOR

Gustave J. Lang, Longmeadow, Mass., assignor to United American Bosch Corporation, Springfield, Mass., a corporation of New York Application October 21, 1932, Serial No. 638,898

3 Claims. (Cl. 98—2)

This invention pertains to improvements in deflectors; and especially deflectors adapted to protect the occupants of vehicles against an uncomfortable draft of air entering the vehicle from without.

An object of the invention is to provide a deflector that can be mounted on an automobile, for example, and arranged to divert a current of incoming air to the outside of the vehicle; thus permitting ample ventilation of the car without subjecting the occupants thereof to the risk of taking cold or contracting other ailments.

Another object of the invention is to provide an air or draft deflector of this character designed to enable it to be mounted on a closed automobile adjacent one of the windows thereof and adjusted to operative or inoperative position as desired, without interfering with the ordinary construction now employed for building windows into such a car and without interfering in the least with the operation of such windows.

A further object of this invention is to provide a deflector of this type and of compact form and restricted size, so that it will occupy little space and in no way restrict the carrying capacity of the car or crowd the passengers.

These and other objects and advantages are fully set forth in the ensuing description, and the novel features are recited in the appended claims; but the disclosure is explanatory only and variations in details may of course be adopted in accordance with the spirit of the invention and without exceeding the scope and meanings of the broad terms in which the appended claims are expressed.

On the drawings:

Fig. 1 is a side elevation of a deflector according to this invention;

Fig. 2 is a section along the line 2—2 of Fig. 1, showing the deflector with its parts folded together when not needed for use;

Fig. 3 is a view similar to Fig. 2 showing the deflector with its parts in operative position;

Fig. 4 is a diagrammatic view showing the parts for adjustably mounting the deflector proper at the top and bottom;

Fig. 5 is a horizontal section, and Fig. 6 a perspective view showing the method of mounting my improved deflector on an automobile; and Fig. 7 shows details of construction.

The same numerals identify the same parts throughout.

I shall refer first to Figs. 5 and 6 to explain the utility of my improvement. On these figures the numeral 1 indicates a window pane in an opening at the side 2 of an automobile. I mount my deflector by pivotally connecting it along the vertical rear edge of this window opening within the space enclosed by the body of the car, so that the window can be raised and lowered or otherwise opened and shut in the usual way. The invention comprises a deflector member 3 in the form of a curved plate of celluloid, glass or other suitable material which can be transparent if desired. This material is pivotally mounted along one vertical edge, so that it can be moved into position shown in Figs. 3 and 5, for example, when it is needed to safe-guard the occupants of the car; or the parts can be folded into inoperative position, as shown in Fig. 2. When the front and rear windows of the car are wholly or partly opened a draft of air coming in at the front will be caught by the deflector and diverted to the outside of the car instead of being allowed to flow in without obstruction against the inner surface of the back of the car and create strong currents of air in the vehicle to blow directly upon the occupants. The car is thus fully ventilated but the occupants of the car do not receive the impact of the draft and the comfort of riding is in no way diminished. I prefer to use two of these deflectors, one at each side of the rear seat 4 of the car and pivotally mounted as above stated along the vertical edges of the adjacent window openings.

These deflector members 3 are each mounted to swing about a vertical pivot or axis in the form of a shaft 5 which is firmly secured at its upper and lower ends. At 6 I show a channel-shaped strip which receives and grips the rear edge of the deflector plate 3 and has bearing portions 7 which engage the shaft 5. The forward edge of the plate 3 is received in another channel-shaped strip 8 and these channelled strips have perforated lugs 9 bent over and extending laterally at their upper and lower ends to enable them to be fastened to a horizontal plate 10. There will be several plates or leaves 10 associated with each deflector, both at the top and bottom; and as the construction is the same at the upper and lower ends of each deflector, the description of the plates at the lower end of the deflector, as shown in Figs. 2 and 3 will suffice. On these figures, the lugs 9 are shown as secured to a horizontal plate 10 by means of screws; this plate has one edge curved to correspond with the horizontal curvature of the plate 3 and said edge is bent up to provide a flange 11 which engages the lower edge of this plate of the deflector member 3 on the convex surface thereof. On the opposite or concave side is a curved angle-shaped strip 12 which is attached to the upper face of the plate 10 between the lugs 9, by screws or other fastening devices, and one web of this strip 12 bears against the surface of the member 3 along the bottom thereof. The plate or member 3 is thus gripped between the flange 11 and angle-shaped strip 12 and braced throughout its entire width. Thus it is secured to the top and bottom plates or leaves 10 in the most efficient manner.

Each plate or leaf 10 overlies similar plates 13, one over the other and the plates 10 and 13 cooperate with a fixed plate 14 over which they are disposed and which is secured to the rear edge of the window opening having the pane 1. The plates 13 have perforations which receive the shaft 5 to enable them to rotate about this shaft with the plate and the swinging edges of the plates or leaves 13 are bent over to provide curved channels 15; which at the ends nearer to the deflector member 3 have projections 16; and plate 14 has a similar channel and projection. Each plate or leaf 10 also has a lug 17 in position to engage the projection 16 of the adjacent plate 13, which has a similar lug 18 in position to engage the projection 16 of the other plate 13; and the remaining plate 13 has a similar lug in position to engage the projection 16 of the plate 14. Hence when the deflector member 3 is moved out to operative position, the plates or leaves 10 and 13 move with respect to one another, and fixed plate 14 as far as the projections 16 and lugs 17 and 18 will permit, as shown in Fig. 3. The transverse edge of each leaf 10 remote from the shaft 5 moves in the channel provided by the edge 15 of the adjacent plate 13; and the edge 15 of this plate 13 moves in the channel provided by the corresponding edge of the other plate 13; while the edge 15 of this last-named plate 13 is received in the channelled edge of the plate 14. Thus the leaves or plates can be folded together one overlying another whenever the deflector is to be moved out of operative position, as shown in Fig. 2. The plates 14 have extensions 19 which are bent in vertical position and perforated to receive screws which affix the plates 14 to the rear edge of the window opening. These portions may have bearings 20 to engage the shaft 5 between the bearings 7 on the strip 6.

The utility of the deflector will now be made clear. Whenever one of the passengers wishes to protect himself against a draft due to open windows on his side of the car, the member 3 is moved by swinging it about the shaft 5 into the position shown in Figs. 3, 5 and 6. The projections 16 and lugs 17 and 18 limit the inward movement of the deflector member 3 and prevent it from passing beyond the position for catching the incoming current of air and turning it outward as indicated by the arrows in Fig. 5. At other times when the deflector is not needed it is simply pushed towards the window opening causing the plates or leaves 10 and 13 and the plate 3 to move into position shown in Fig. 2.

I have found this deflector to be very efficient in preventing cross currents and injurious drafts within the car. The windows can be kept open when the car is in rapid motion so as to give full ventilation and yet the occupants of the car will be so well protected that a lighted match held by the passenger in the rear seat of the car will not be extinguished. The entire deflector comprises parts that can be very easily made and put into place and cost relatively little to produce.

It will be apparent of course that when the deflector plate 3 is in its operative position, the leaves 10, 13 and 14 will act as guards, so that none of the air can escape around the top and bottom edges of the deflector plate, past said guards or shields.

While I prefer to use this improvement on closed cars, it is also useful on open cars when mounted in a similar position.

Having described the invention, what is claimed is:

1. A deflector having a plate, channelled strips engaging the opposite vertical edges of the plate, said strips each having laterally extending lugs at both the ends, and a horizontal plate secured to the deflector plate by fastening devices extending through said lugs, said horizontal plate extending to one side of the deflector plate.

2. A deflector having a plate, channeled strips engaging the opposite vertical edges of the plate, said strips having laterally extending lugs at the ends, and a horizontal plate secured to the deflector plate by fastening devices extending through said lugs, said horizontal plate extending to one side of the deflector plate.

3. A deflector having a plate, channelled strips engaging the opposite vertical edges of the plate, said strips each having laterally extending lugs at both ends, a horizontal plate secured to the top and bottom of the deflector plate by fastening devices extending through said lugs, said horizontal plates extending to one side of the deflector plate.

GUSTAVE J. LANG.